United States Patent

Aoki et al.

[11] Patent Number: 5,201,277
[45] Date of Patent: Apr. 13, 1993

[54] DISPLAY APPARATUS FOR VEHICLE

[75] Inventors: Kunimitsu Aoki; Tadashi Iino; Yoshiyuki Furuya, all of Shizuoka, Japan

[73] Assignee: Yazaki Corporation, Tokyo, Japan

[21] Appl. No.: 812,981

[22] Filed: Dec. 24, 1991

[30] Foreign Application Priority Data

Dec. 26, 1990 [JP] Japan .................. 2-404670[U]

[51] Int. Cl.$^5$ .............................................. G01D 13/22
[52] U.S. Cl. .................................... 116/286; 116/327
[58] Field of Search ............ 116/284, 286, 287, 288, 116/295, 298, 301, 302, 305, 327, 328, 332, DIG. 6, 62.1, 62.2, 62.3, 62.4; 368/223, 227, 228, 238

[56] References Cited

U.S. PATENT DOCUMENTS

| 2,108,342 | 2/1938 | Le Fevre | 116/62.1 |
| 2,173,316 | 9/1939 | Sproule | 116/286 X |
| 3,490,226 | 1/1970 | Anderson et al. | 368/238 X |

FOREIGN PATENT DOCUMENTS

| 0301439A2 | 2/1989 | European Pat. Off. |  |
| 2030517 | 1/1972 | Fed. Rep. of Germany | 116/286 |
| 2548559 | 5/1977 | Fed. Rep. of Germany | 368/238 |
| 2942443A1 | 4/1981 | Fed. Rep. of Germany | . |
| 3906721A1 | 9/1990 | Fed. Rep. of Germany | . |

OTHER PUBLICATIONS

Patent Abstracts of Japan, Appl. No. 55-97875, May 2, 1982.

Primary Examiner—William A. Cuchlinski, Jr.
Assistant Examiner—W. Morris Worth
Attorney, Agent, or Firm—Armstrong, Westerman, Hattori, McLeland & Naughton

[57] ABSTRACT

The object of the present invention is to provide a display apparatus for a vehicle in which luminance of the display pattern of letters, graduations, a pointer, and the like are increased without unevenness in the luminance but also the distance between a front face of a pointer plate and a rear face of the movement of the display apparatus is shortened. A circular pointer plate with a transmitting slit is disposed on front a portion of the display apparatus. An outer periphery of the pointer plate is toothed and is engaged with a driving gear fixed to a driving shaft of the movement to be directly driven by the movement. A dial is disposed on a back face of the pointer plate. A portion where the dial overlaps the pointer plate, and other portion for graduations and the like which surrounds the portion are formed as light transmitting portion, but, other portions are formed as light intercepting portion. Behind the pointer plate is installed a discharge lamp with a reflector.

5 Claims, 8 Drawing Sheets

F I G. 1
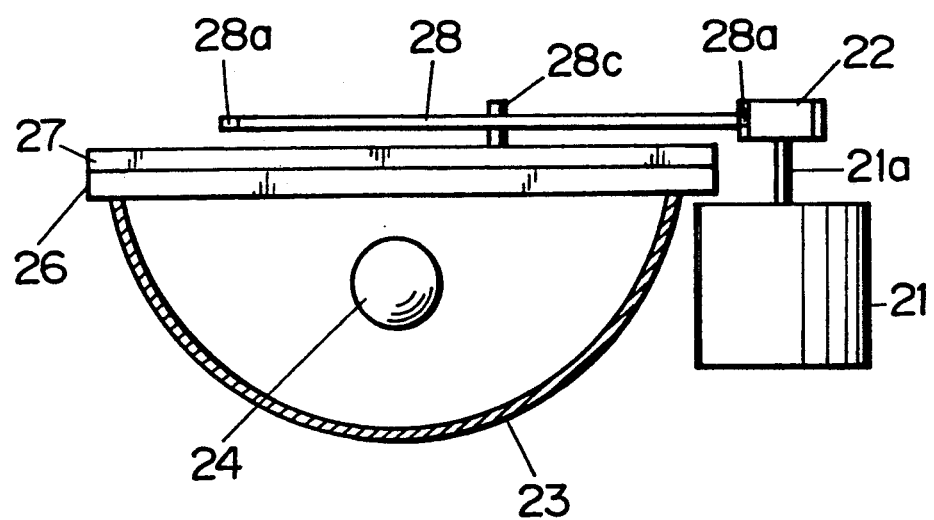

DISPLAY APPARATUS FOR VEHICLE

BACKGROUND OF THE INVENTION

1. Field of the Invention

This invention relates to an analog meter of light emitting type in which letters, a dial, a pointer and the like may look such that they emit light therefrom, and more particularly to a display apparatus suitable for use with an analog meter for a vehicle.

2. Description of the Prior Art

An exemplary one of such analog meter of light emitting type is shown in FIG. 14.

This type of meter includes a meter mechanism 41, a dial 42, and a light introducing plate 43 interposed between the meter mechanism 41 and the dial 42. Thus, light from a light source bulb 44 is introduced into the light introducing plate 43 by way of ends 43a thereof so as to cause the light introducing plate 43 to emit light to a back face of the dial 42 so that a transmitting graduated portion and so forth formed on the dial 42 may look such that they emit light therefrom. The pointer 45 also may look such that it emits light therefrom by introducing light, which is introduced from the light introducing plate 43 to a boss 45a of the pointer 45 through periphery of a pointer shaft 41a, into the pointer 45 and dispersing the light in the pointer 45.

Meanwhile, in daytime during operation, when intense light such as sun light is introduced from a windshield into a driver's seat of an automobile or immediately after an automobile enters a tunnel, changing in amount of external light causes a drivers' eyes to be dazzled because irises of the driver become small, which reduces visibility of the display since overall meter looks dark. In order to prevent the poor visibility, it is considered that luminance of the display pattern should be increased. However, in the conventional display apparatus for a vehicle with the light emitting analog meter described above, since the introducing plate is used for indirectly emitting light on back face of the dial, small luminance of the display pattern and unevenness in the luminance makes it difficult to solve the problem.

Therefore, in Japanese Patent Application No. Heisei 1-321496, the applicant has already proposed an analog meter of light emitting type with high luminance which is provided with a discharge lamp and a reflector as a light source to display graduations, letters, a pointer, and the like without uneven luminance and to keep the luminance at high level. This display apparatus for a vehicle is outlined in FIG. 11. As described in cross-sectional view of the figure, the display apparatus includes a circular pointer plate 18 having a light transmitting slit on the front surface thereof and a dial 17 behind the rear surface thereof. Portions of the dial 17 for graduations and numerals are void and a circular portion where these portions overlap with the pointer plate 18 is formed to permit light to transmit therefrom. Other portions are formed to have black face.

Further, the dial 17 is provided with a light dispersion plate 16 on the rear face thereof and is further provided with a reflector 13 behind the light dispersion plate. A semi-cylindrical concave reflecting portion of the reflector 13 is directed to the dial 17 side, and a cylindrical discharge lamp 14 having a shape of cylinder is disposed along a focus of the reflector 13. Behind the reflector 13 is disposed a mechanism 11 (movement). The mechanism rotates the pointer shaft 11a according to electrical signals from an electrical circuit not shown to rotate the pointer plate 18 fixed to an end of the pointer shaft 11a.

As shown in FIG. 11, the display apparatus for a vehicle described above has a distance d, which requires a relatively large space for accommodating the apparatus in the vehicle. Moreover, it may be difficult for some vehicles to accommodate the apparatus therein. As shown in FIG. 12, when a reflector 13' having a concave portion at the center thereof, the mechanism 11 can be accommodated in the concave portion so that the distance d can be shortened. However, it becomes necessary to dispose the discharge lamps 14 at both sides, as shown in FIGS. 12, and 13, which causes areas m to be bright and an area n dark. On the other hand, when dispersion effect is improved to prevent unevenness in the luminance, overall luminance will be decreased.

SUMMARY OF THE INVENTION

The object of the present invention is to provide a display apparatus for a vehicle in which not only luminance of the display pattern of letters, graduations, a pointer, and the like are increases without unevenness in the luminance but also the distance d of the apparatus is shortened.

A display apparatus for a vehicle according to the present invention including a pointer emitting light therefrom by backlight, a dial having a graduated portion emitting light therefrom, which is disposed adjacent to said pointer, a movement for driving the pointer: characterized in that the pointer is a circular pointer plate of light intercepting type; a light transmitting slit is formed from a center portion of the pointer plate to an outer periphery thereof; the dial is provided with a light transmitting circular portion overlapping the pointer plate; a graduated portion outwardly arranged from the circular portion of the pointer plate has light transmitting character and is disposed so that the pointer plate overlaps an inner portion of the graduated portion; a light source for emitting the backlight is disposed behind the dial; and the movement is installed so as to transmit driving force to an outer periphery of the pointer plate.

On turning on a light source, light passes through the graduated portion so that the graduated portion may look such that it emits light therefrom and the light is recognized by the driver. Further, light passing through the circular portion of the dial falls on the pointer plate and a part of the light travels through the slit also, permitting the slit to look such that it emits light therefrom and to be recognized by the driver. Then, when the movement is driven according to the electrical signals, the driving power applied to the outer periphery of the pointer plate causes the movement to rotate. Then, the pointer plate stops at a position in accordance with the electric signals to permit the slit emitting light therefrom to indicate the graduated portions emitting light therefrom.

BRIEF DESCRIPTION OF THE DRAWINGS

The present invention will be more apparent from the ensuring description with reference to the accompanying drawing wherein:

FIG. 1 is a side sectional view of a display apparatus for a vehicle according to an embodiment of the present invention;

DETAILED DESCRIPTION OF PREFERRED EMBODIMENTS

Figure 2:
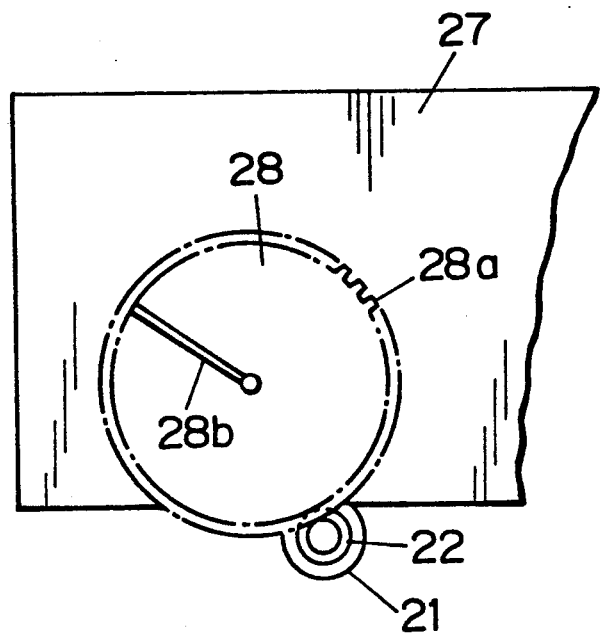
FIG. 2 is a partial front view of the display apparatus for a vehicle of FIG. 2.

FIG. 1 shows a display apparatus for a vehicle according to an embodiment of the present invention. The display apparatus includes a circular pointer plate 28 having a light transmitting slit on the front surface thereof and a dial 27 behind the rear surface thereof. Portions of the dial 27 for graduations and numerals are void and a circular portion where these portions overlap with the pointer plate 18 is formed to permit light to transmit therefrom. Other portions are formed to have black face.

Further, the dial 27 is provided with a light dispersion plate 26 on the rear face thereof and is further provided behind the light dispersion plate with a reflector 23 having a semi-cylindrical concave reflecting face which is directed toward the dial 27. Along a focus of the reflector 23, a cylindrical discharge lamp 24 is mounted. Further, under the reflector 23 (right side of FIG. 1) is disposed a movement 21 and a driving shaft extrudes from the center portion of the movement 21. A driving gear 22 is fixed to the driving shaft 21a.

Figure 3:
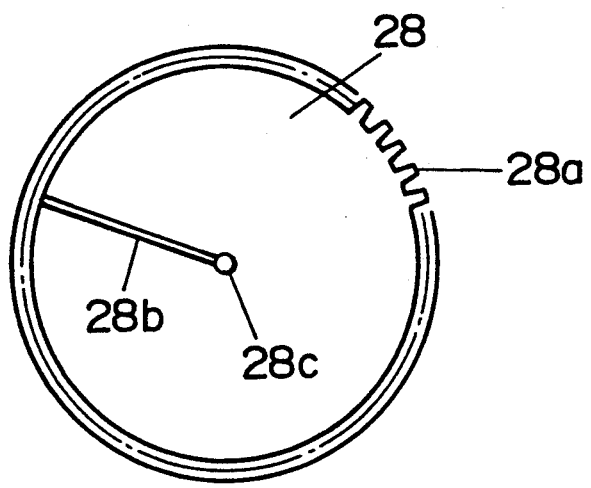
FIG. 3 is an enlarged view of the pointer plate of FIG. 2.
Figure 4:
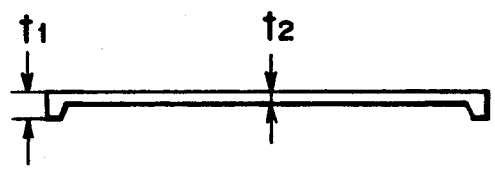
FIG. 4 is a cross sectional view of the pointer plate of FIG. 2.

Further, as shown in FIG. 3, the pointer plate 28 has a toothed portion at the outer periphery thereof and is provided with a light transmitting slit 28b extending from the center portion to the periphery thereof. As described in FIG. 4, the pointer plate 28 is decreased in thickness t2 of inner periphery 28b thereof and is increased in thickness t1 of outer periphery 28a thereof to reduce its weight in consideration of its inertia moment. Further, the center portion 28c of the pointer plate 28 is fixed to and supported by the dial 27 as shown in FIGS. 1 and 2, and the outer periphery 28a thereof is engaged with the driving gear 22 fixed to the driving shaft 21a of the movement 21.

Then, when the discharge lamp 24 is switched on, since the lamp 24 is disposed along a focus of the reflector 23, parallel light after being reflected by the reflector 23 falls on the dial 27 by way of the light dispersion plate 26. As a result, the light travels through the graduated portion of the dial so that it may look such that it emits light therefrom and is recognized by the driver. Further, light transmitted by the circular portion of the dial 27 falls on pointer plate 28 and a part of the light is transmitted through a slit 28b so that the slit also may look such that it emits light therefrom.

Then, the movement 21 is actuated according to electrical signals from an electrical circuit not shown to rotate the movement 21, causing the driving gear fixed to the pointer shaft 21a to be rotated together with the movement 21. As a result, the pointer plate 28 of which outer periphery 28a is engaged with the driving gear 22 is rotated about the center portion 28c thereof. Then, as described above, since light from the light source is transmitted through the slit 28b of the pointer plate 28, the slit 28b emitting light therefrom indicates the graduated portion emitting light therefrom in accordance with the electrical signals.

As described above, the driving gear 22 is fixed to the driving shaft 21a of the movement 21 which drives the pointer plate 28 of the display apparatus for a vehicle so as to drive the pointer plate through direct engagement with the outer periphery 28a of the pointer plate, permitting driving torque to be reduced in comparison to that required for driving the center portion of the pointer plate 28. Moreover, since the movement 21 need not to be installed behind the pointer plate 28, the distance between the front face of the pointer plate 28 and the rear face of the movement 21 can be shortened to obtain compact apparatus, permitting the display apparatus to be accommodated in a narrow space and making the design of light sources with backlight easier.

Figure 5:
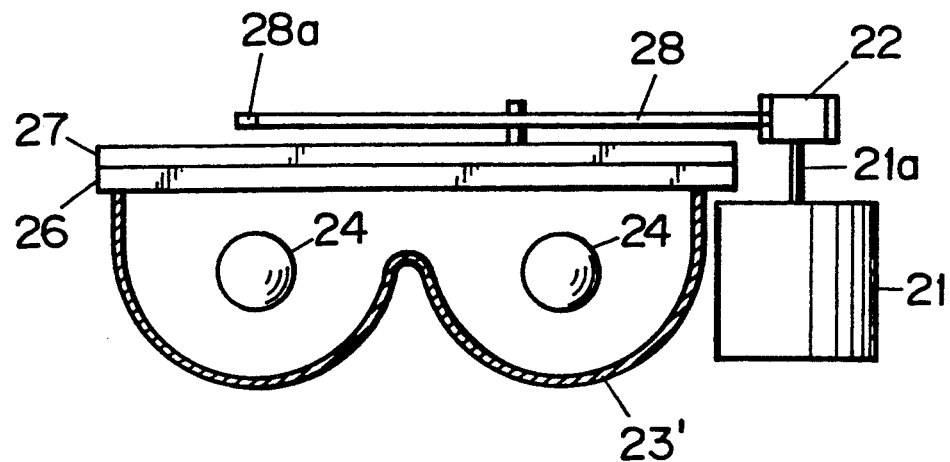
FIG. 5 is a display apparatus for a vehicle of FIG. 1 in which two light sources are disposed.

Further, since it is unnecessary to mount the driving shaft 21a rotating the pointer plate 28 at the center portion 28c of the pointer plate, not only driving torque of the movement is to be reduced but also the light source providing backlight to the pointer plate 28 and the dial 27 is to be designed in such a manner as shown in FIG. 5 as well as FIG. 1. That is, the reflector can be designed to have a shape of double concave portion for accommodating two discharge tubes, providing a display apparatus for a vehicle without uneven luminance.

Figure 6:
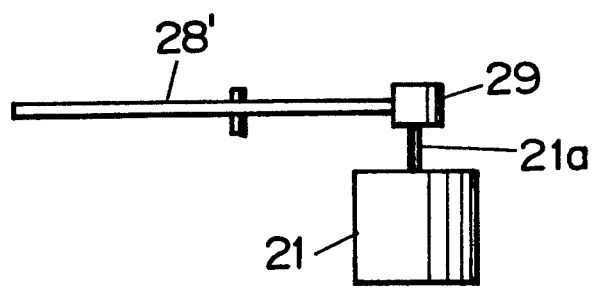
FIG. 6 is a display apparatus for a vehicle of FIG. 1 in which a roller is applied in place of a gear.
Figure 7:
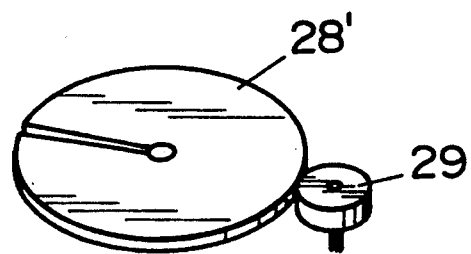
FIG. 7 is a perspective view of the display apparatus for a vehicle of FIG. 6.

Meanwhile, in place of the driving gear 22 fixed to the driving shaft 21a of the movement described above, as shown in FIGS. 6 and 7, a driving roller 29 and a roller-type pointer plate 28' with roller-shaped periphery portion 28'a may be used.

Figure 8:
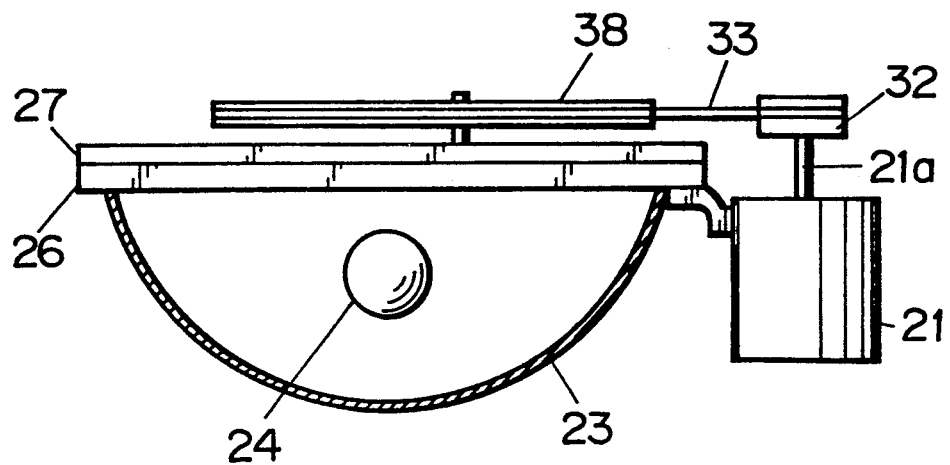
FIG. 8 is a view showing the display apparatus for a vehicle of FIG. 1 in which pulleys are used for belt driving in place of a pointer plate and a driving gear.
Figure 9:
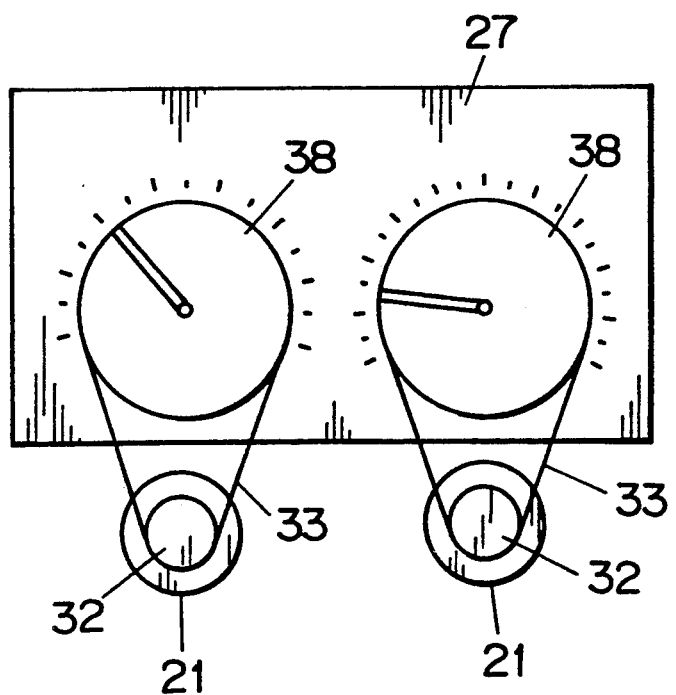
FIG. 9 is a front view of the display apparatus for a vehicle of FIG. 8.

Referring to FIGS. 8 and 9, in place of the driving gear 22, pointer plates 38 may be driven by belts 33 applied between small driving pulleys 32 fixed to driving shafts 21a and pulley-type pointer plates. Channels on the outer periphery of the driving pulleys 32 and pointer plates 38 are provided with jagged portions and the inner surface of the belts also have jagged portions, preventing them from slipping by engaging the jagged portions with each other.

Next, a second embodiment of the present invention will be explained. In this embodiment, the shape of the pointer plate 28, which is shown in the first embodiment, is modified and an ultrasonic motor is applied in place of the movement 21 for driving the pointer plate. The same parts and members as used in the first embodiment are applied having the same numerals, and the explanation therefor will be omitted.

Figure 10:
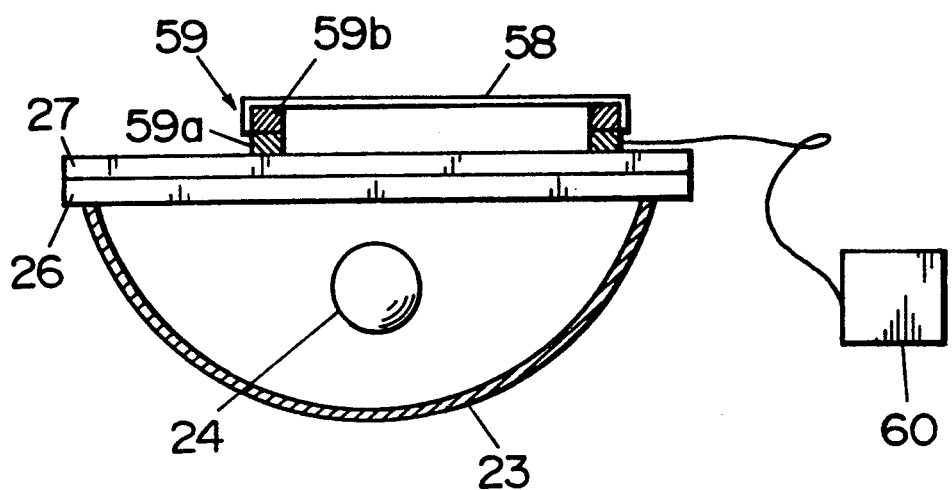
FIG. 10 is a display apparatus for a vehicle according to a second embodiment of the present invention.
Figure 11:
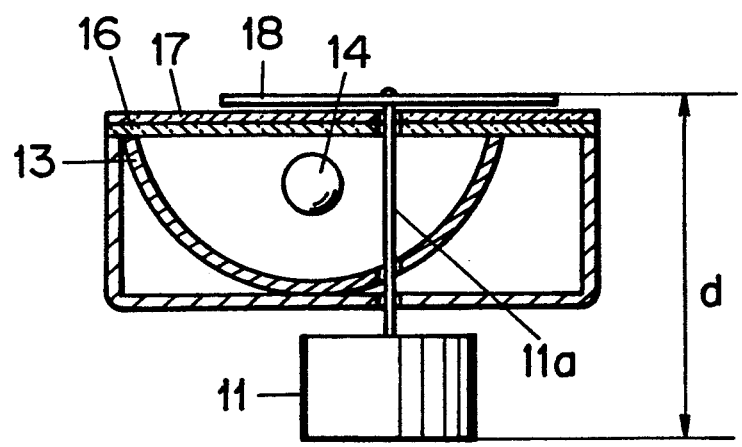
FIG. 11 a side cross sectional view of the display apparatus for a vehicle as a light emitting analog meter according to the present invention.
Figure 12:
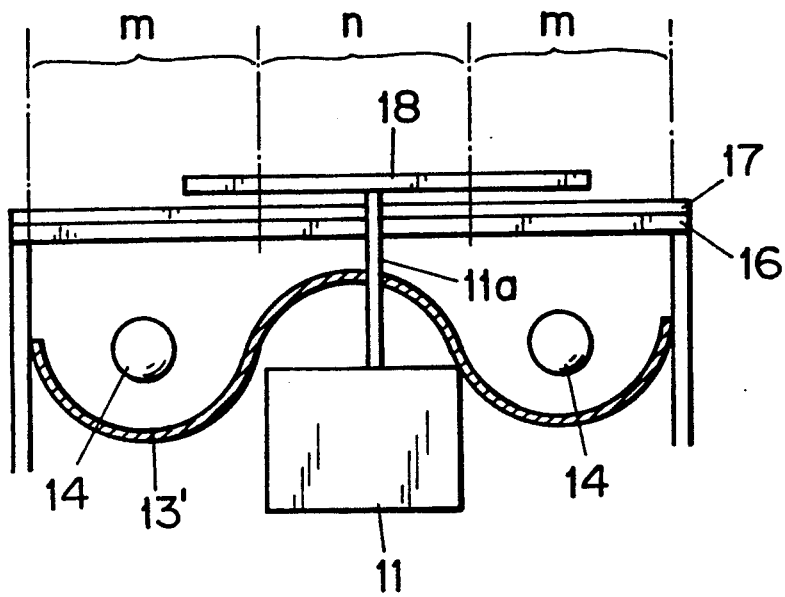
FIG. 12 is a display apparatus for a vehicle of FIG. 11 in which the reflector is modified, and a movement is disposed at the center of the reflector, and two light sources are installed.
Figure 13:
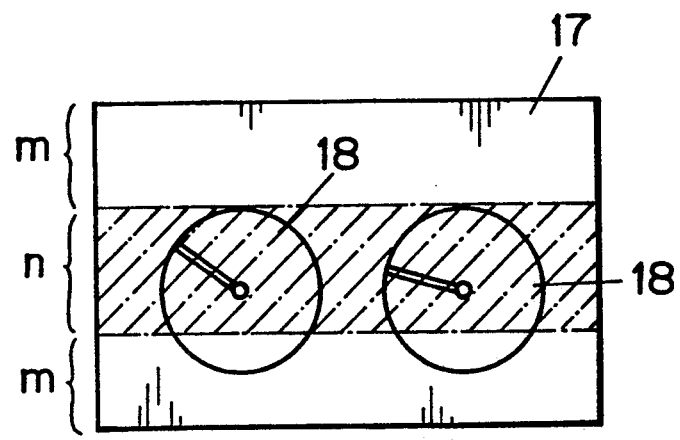
FIG. 13 is a front view showing brightness of the display apparatus for a vehicle of FIG. 12.
Figure 14:
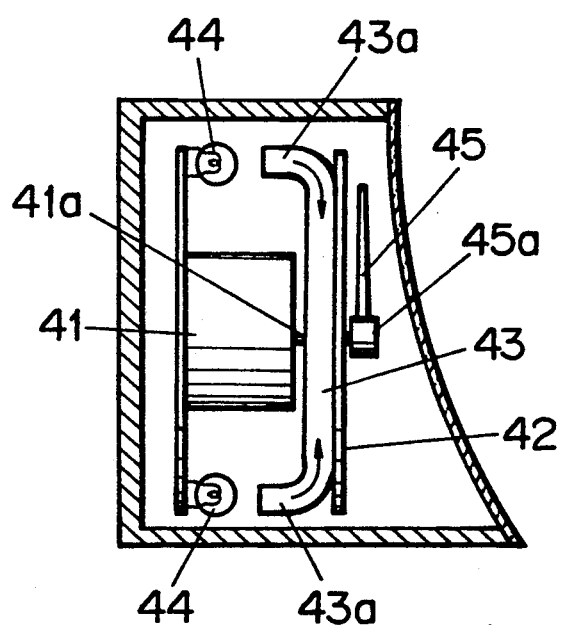
FIG. 14 is a side view of a conventional display apparatus for a vehicle as light emitting analog meter.

A display apparatus for a vehicle according to this embodiment is provided with a ring-type ultrasonic motor on the dial 27 thereof as shown in FIG. 10. The ultrasonic motor 59 has substantially the same inner diameter as that of the circular transmitting portion of the dial 27. A stator 59a is fixed in such a manner that a piezoelectric ceramic opposes the dial 27 so that the ultrasonic motor encloses the circular portion. Further, a rotor 59b opposing the stator 59a is provided with a circular pointer plate 58. The pointer plate 58 has an outer periphery bending at right angles and is in contact with a side of the rotor 59b. Further, the pointer plate 58 has a transmitting slit extending from the center portion to a portion adjacent to the outer periphery thereof as described in FIG. 1.

The stator 59a is connected to a well-known driving circuit 60 for driving the ultrasonic motor 59. The driving circuit 60 is actuated by an electrical signal generator not shown to transmit driving signals to the piezoelectric ceramic of the stator 59a. By the signals, the piezoelectric ceramic vibrates by ultrasonic waves to cause the surface of the stator 59a to wave. As is generally known, since each point of the surface of the stator 59a moves elliptically with small vibration amplitude, a rotor 59b which is in contact with an apex of the wave of the stator 59a rotates in accordance with the elliptical movement. Then, the slit of the pointer plate which is fixed to the rotor 59b indicates a graduation in accordance with the electrical signal.

As described above, since the display apparatus for a vehicle according to the present invention employs an ultrasonic motor 59 as a movement for driving a pointer plate, overall apparatus becomes compact. An outer periphery of the pointer plate 58 is directly driven to rotate the pointer plate 58, permitting even small torque to drive the pointer plate 58. Further, high response peculiar to an ultrasonic motor is displayed in this invention.

As explained above, according to the invention, since a movement for driving a pointer plate is disposed so as to transmit driving power to an outer periphery of the display pointer, driving torque will be decreased. Further, since it is unnecessary to mount a driving shaft rotating the pointer plate at a center portion of the pointer plate, the distance between a front face of the pointer plate and a rear face of the movement can be shortened to obtain compact apparatus, permitting the display apparatus to be accommodated in a narrow space and making design of light sources with backlight easier. Further, short driving shaft will improve aseismatic character of the display apparatus for a vehicle.

What is claimed is:

1. A display apparatus for a vehicle, comprising:
    a transmitting circular pointer plate having a center portion, an outer periphery, and a slit extending from said center portion to said outer periphery;
    a dial adjacent to said pointer plate, said dial having a transmitting portion having a generally circular shape which overlies said pointer plate, said dial having graduations at outer peripheral portions of said transmitting portion;
    mounting means for rotatably supporting said pointer plate relative to said dial;
    a light source means disposed on an opposite side of said dial from said pointer plate, for generating backlight for said dial including a light dispersion plate and a reflection; and
    driving means for driving said outer periphery of said pointer plate to cause rotational movement of said pointer plate, said driving means having a movement which is disposed along side of said reflector for driving said pointer plate according to a value measured by a sensor.

2. A display apparatus for a vehicle as claimed in claim 1, wherein said driving means includes a driving shaft, and a driving gear in driving contact with said outer periphery of said pointer plate, and wherein said outer periphery of said pointer plate is toothed, whereby said outer periphery of said pointer plate is driven by operation of said movement.

3. A display apparatus for a vehicle as claimed in claim 1, wherein said driving means includes a driving pulley and a belt for driving said outer periphery of said pointer plate.

4. A display apparatus for a vehicle as claimed in claim 1, wherein said reflector has a concave reflecting surface which is directed toward said dial, and said light source further comprises a discharge lamp disposed at a focus of said reflector.

5. A display apparatus for a vehicle as claimed in claim 4, wherein said concave reflecting surface of said reflector comprises a semi-cylindrical concave face, and said discharge lamp comprises a cylindrical discharge lamp disposed along a focus of said semi-cylindrical concave face.

* * * * *